(12) United States Patent
Schaefer

(10) Patent No.: US 6,257,470 B1
(45) Date of Patent: Jul. 10, 2001

(54) VEHICLE CARGO CARRYING DEVICE

(76) Inventor: David R. Schaefer, 301 Piper Cub Ct., Scotts Valley, CA (US) 95066

( * ) Notice: Subject to any disclaimer, the term of this patent is extended or adjusted under 35 U.S.C. 154(b) by 0 days.

(21) Appl. No.: 09/520,480

(22) Filed: Mar. 8, 2000

(51) Int. Cl.⁷ .................................................. B60R 9/00
(52) U.S. Cl. ......................... 224/318; 224/319; 224/328; 224/901.6
(58) Field of Search ........................... 224/314, 318, 224/319, 320, 328, 901.6

(56) References Cited

U.S. PATENT DOCUMENTS

| | | | |
|---|---|---|---|
| 2,090,986 | * 8/1937 | Rush | 224/318 |
| 2,105,989 | * 1/1938 | Rush | 224/318 |
| 2,196,341 | * 4/1940 | Rush | 224/318 |
| 3,000,418 | * 9/1961 | Bitting | 224/328 X |
| 3,000,419 | * 9/1961 | Morrison | 224/318 |
| 3,968,913 | * 7/1976 | Weed et al. | 224/488 |
| 4,779,779 | * 10/1988 | Haugland | 224/328 |
| 5,288,003 | * 2/1994 | MacDonald | 224/328 |
| 5,538,169 | * 7/1996 | Moore | 224/328 |

* cited by examiner

*Primary Examiner*—Stephen K. Cronin
(74) *Attorney, Agent, or Firm*—Jeffrey A. Hall

(57) ABSTRACT

A vehicle cargo carrying device, for transporting and protecting articles on the roof of a vehicle comprises a one piece cargo bag with an aperture with a plurality of pieces of hook and loop fastening material operably positioned in proximity thereto. The aperture has a plurality of pieces of hook and loop fastening material sewn into an outer surface of the bag in proximity to the aperture, and a pair of pieces of hook and loop fastening material sewn are along an inner edge of the interior of the aperture. A strapping system is provided for securing the one piece cargo bag to a roof of a vehicle. One or more handles may be attached to the outer surface of the device for carrying and transport of the device. An inner liner system may be provided for further waterproofing and protection of articles being transported.

14 Claims, 2 Drawing Sheets

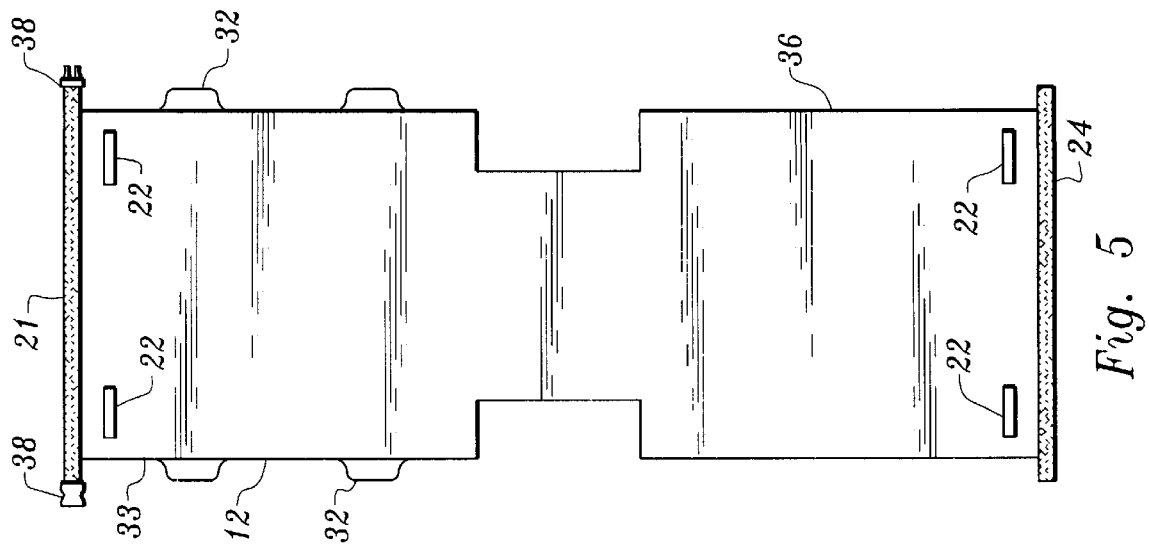
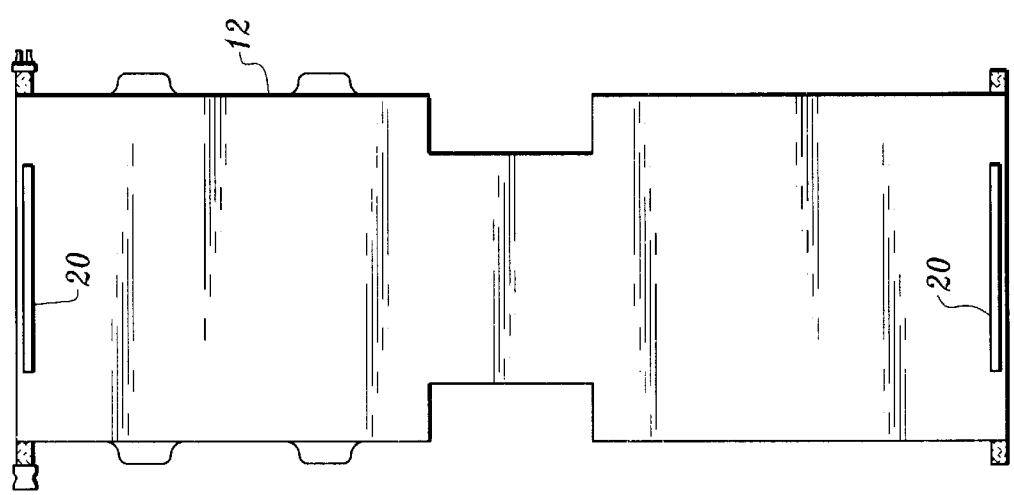
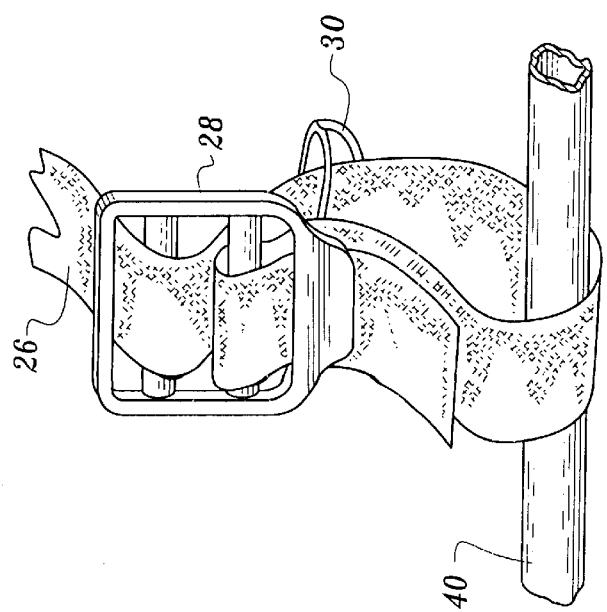

US 6,257,470 B1

VEHICLE CARGO CARRYING DEVICE

BACKGROUND OF THE INVENTION

1. Field of Invention

This invention relates to car top cargo carrying devices and systems. In particular, the invention relates to a flexible bag using a hook and loop fastener closure system, a detachable strapping system, guide straps, liner, and a one piece construction with side seams for waterproof carrying and transport of luggage and other articles.

2. Description of the Related Art

Heretofore, numerous devices have been proposed and implemented for the carrying and transport of cargo and luggage on the top of automobiles and other vehicles. Such devices are intended to transport luggage and other items in a manner which protects them from the wind and weather, while securing them to the roof of the vehicle. Both rigid and semi-rigid devices have been disclosed and implemented, and typically use a zipper system for opening and closing the device. Further, such prior devices typically sew the strapping system into the bag which both limits both the size and type of the luggage rack that such devices will work with. Such prior devices are accordingly severely limited in that they are very difficult to position and secure on the roof a vehicle, are not waterproof, are difficult to load and unload, and are limited in the type of article which can be carried in them.

Accordingly, the present invention provides a novel vehicle top carrying device which uses a three piece system to provide flexibility, a hook and loop closure system for waterproof enclosure of luggage and other articles, a separate, detachable strapping system which fits any size luggage rack, a one piece construction with side seams, and a liner for creating a completely waterproof enclosure Additional objects and advantages of the invention will be set forth in the description which follows, and in part will be obvious from the description, or may be learned by practice of the invention. The objects and advantages of the invention may be realized and obtained by means of the instrumentality's and combinations particularly pointed out in the appended claims.

BRIEF SUMMARY OF THE INVENTION

The present invention is a novel vehicle cargo carrying device, for transporting and protecting articles on the roof of a vehicle. The device comprises a one piece cargo bag with an aperture with a plurality of pieces of hook and loop fastening material operably positioned in proximity thereto. The aperture has a plurality of pieces of hook and loop fastening material sewn into an outer surface of the bag in proximity to the aperture, and a pair of pieces of hook and loop fastening material sewn along an inner edge of the interior of the aperture. A strapping system is provided for securing the one piece cargo bag to a roof of a vehicle. One or more handles may be attached to the outer surface of the device for carrying and transport of the device. An inner liner system may be provided for further waterproofing and thermal protection of articles being transported.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

FIG. 3 shows a detail of a ladder lock on a strap, according to the invention.

FIG. 4 shows an inner view of the material pattern for such carrying device with inside attachments, according to the invention.

FIG. 5 shows an outside view of the material pattern for such carrying device with attachments, according to the invention.

DETAILED DESCRIPTION OF THE INVENTION

Reference will now be made in detail to the present preferred embodiments of the invention as illustrated in the accompanying drawings.

In accordance with the present invention, there is provided a single piece vehicle cargo carrying device, for transporting and protecting articles on the roof of a vehicle. The device comprises a one piece cargo bag with an aperture with a plurality of pieces of hook and loop fastening material operably positioned in proximity thereto. The aperture has a plurality of pieces of hook and loop fastening material sewn into an outer surface of the bag in proximity to the aperture, and a pair of pieces of hook and loop fastening material sewn are along an inner edge of the interior of the aperture. The hook and loop fastening material positions the opening of the bag in the correct preclosing position. The bag is then folded over and the ends of the fold are bent towards each other and buckled. This allows for a waterproof closure which is easy to open and close and is completely waterproof. A strapping system is provided for securing the one piece cargo bag to a roof of a vehicle. One or more handles may be attached to the outer surface of the device for carrying and transport of the device, and for use with the strapping system. An inner liner system may be provided for further waterproofing and protection of articles being transported.

Figure 1:
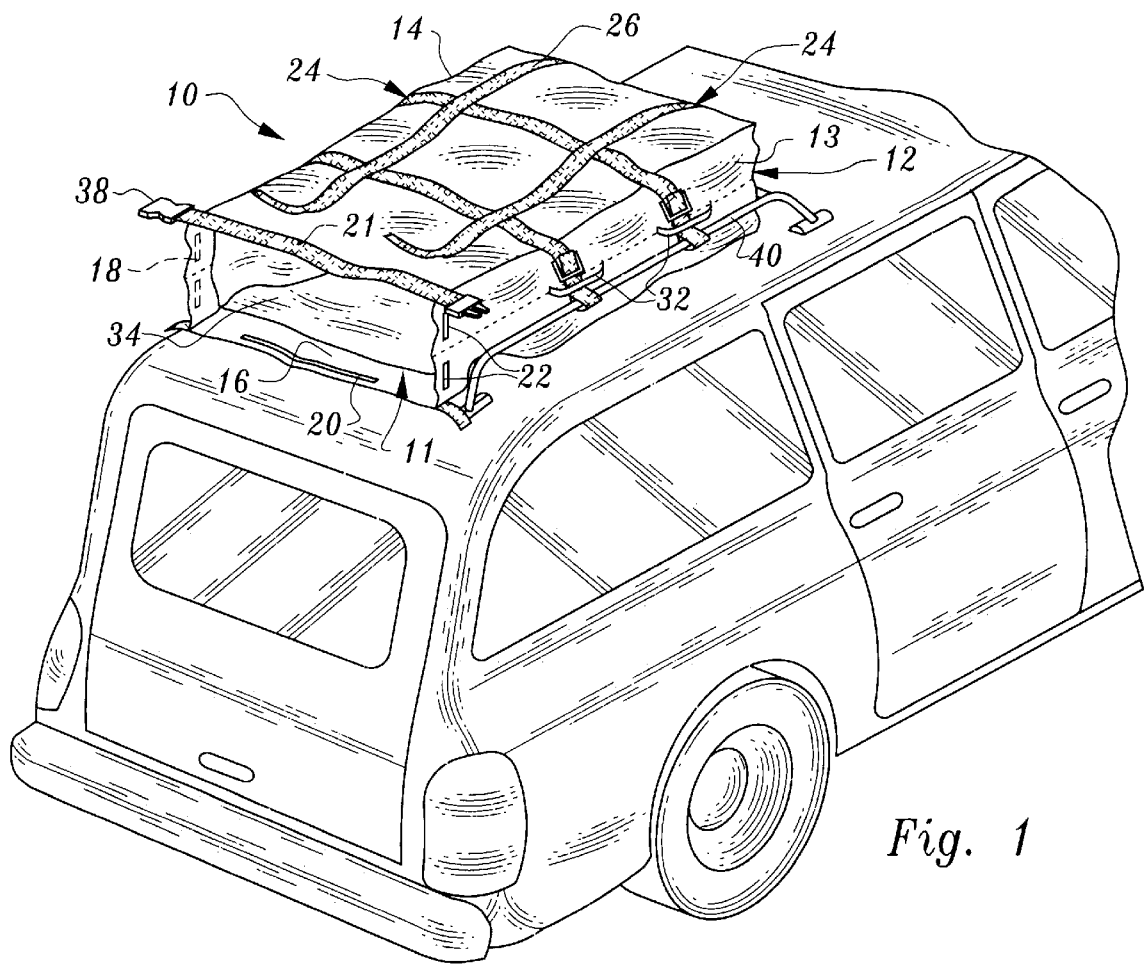
FIG. 1 is a top perspective view of the vehicle cargo carrying device, according to the invention.

In FIG. 1, a vehicle cargo carrying device 10, with interior 11 and exterior 13, for transporting and protecting articles on the roof of a vehicle 12, is shown according to a preferred embodiment of the invention. Carrying device 10 is preferably configured as a one piece bag 14 composed of a durable, resilient, waterproof material.

One piece cargo bag 14 may have a handle or multiple handles 32 attached to outer surface 13 by stitches, or other means. One piece cargo bag 14 includes aperture 16 through which luggage and other articles may be placed in bag. Preferably cargo bag 14 is rectangularly configured but may be otherwise. A plurality of hook and loop fasteners 18, are used to close aperture 16. Preferably the aperture has four pieces of hook and loop fasteners 22 sewn on the outer surface 13, best seen in FIG. 5, and two pieces of hook and loop fasteners 20 sewn on the inner surface, best seen in FIG. 4. A webbing material 21 is preferably attached along width of the top and bottom edges and extends beyond edges 33 and 36, as seen in FIG. 5. A side release buckle 38 is secured to webbing 21, and the webbing on one end may be formed into loops which extend beyond the edges 34 and 36 of bag 14.

Bag 14, is closed by pressing the hook and loop fastening elements 20 and 22 together, causing the edges of the bag to come neatly together, and the sides fold inward. The end is then folded length wise over the webbing 21, using two or more folds. Preferably, the outside ends of the folds are brought together where an attaching means, such as buckle 38, is used to secure the closure. Bringing the ends together also brings the web loops 21 from each end together, providing an additional locking system to keep the ends of bag 14 closed and locked to the luggage rack 40 of the vehicle.

Figure 2:
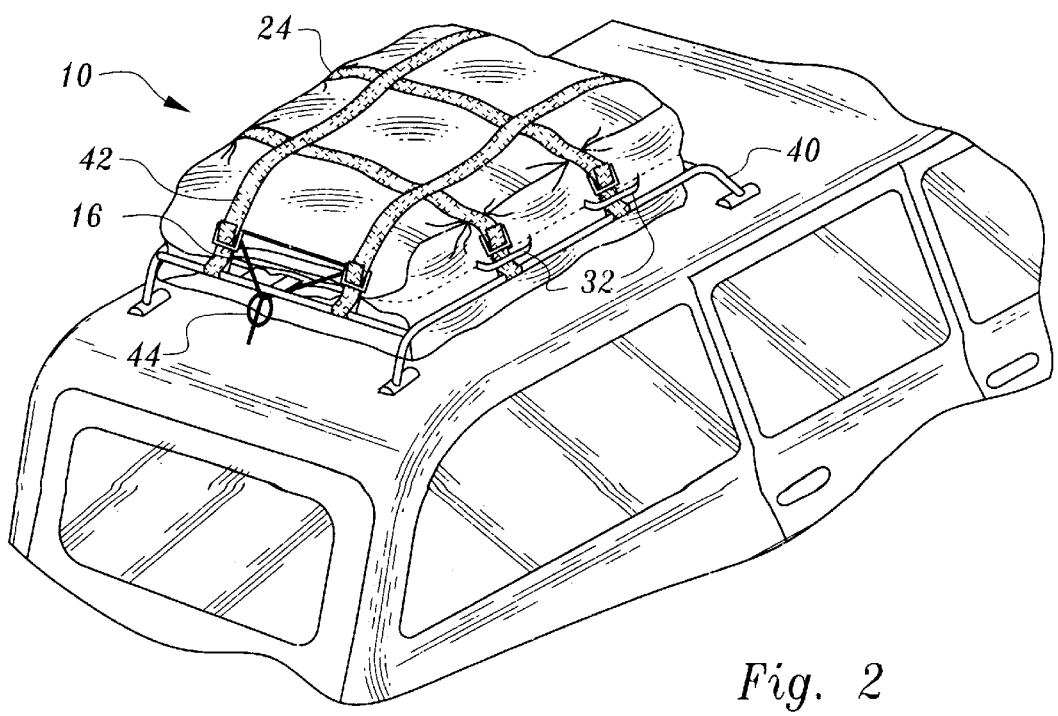
FIG. 2 is a perspective view of such carrying device strapped and attached to a car roof, according to the invention.

A strapping system 24, best seen in FIGS. 1 and 2, comprises a plurality of webbing straps 26, preferably composed of nylon, sewn together. Preferably two pieces, each parallel to one another, are positioned at a 90 degree angle to another pair of webbing straps. At each end of the strapping system 24 is a locking means, preferably a ladder lock 28, and slide bar 30, best seen in FIG. 3, so that the end of each strap passes through a handle 32 on bag 14, wraps around luggage rack 40, or sport bar, and fastens via ladder lock 28. Slide bar 30 holds ladder lock 28 in place when tension is applied to the strapping system. Preferably, web loops, best seen in FIG. 2, are brought together and fastened or locked, for example by cable lock 44, further securing strapping system 24 over bag 14. Rubber hooks, or rubber coated hooks or other fastening means may be attached to strapping system 24 and used to attach the cargo carrying device 10 to the roof of a vehicle without a luggage rack.

A liner 34, may be provided, preferably configured in a manner similar to the cargo bag, but without straps, buckles, hook and loop fasteners and the like. Preferably liner 34 is composed of a plastic composite which has heat welded seams on the sides and bottom. Liner 34 fits inside bag 14 and is an added protective layer for waterproofing the bag and further acts as a heat shield, by reflecting the heat from the contents of the bag.

In operation and use, vehicle cargo carrying device 10, is extremely efficient and easy to use, and provides a completely waterproof system for transport of luggage and other articles on the roof of a vehicle, with or without luggage racks. However, the configuration described is especially suited for vehicles with luggage racks or attached sports bars.

Liner 34 fits inside carrier bag 14 and provides complete weather protection, and if a reflective metal-like finish is used, reflects heat from the liners contents. As carrier bag 14 has a water tight closing system and is composed of a waterproof material, it is not necessary to use a liner, however, the added protection is from any water seepage through stitches such as in severe rains, however, such seepage is then blocked by liner 34.

If the vehicle on which vehicle cargo carrying system 10 is used has a luggage rack 40, then carrier bag 14, sits within the confines of the luggage rack and is packed with luggage or other articles and then closed in the manner previously described. The strapping system 24 is then used to secure bag 14, with any unused straps simply being tied off. Strapping system 24, allows the cargo carrying device 10 to be used on any size luggage rack or on four or two bar systems. As some vehicles have two luggage rack bars, one in the front and one in the back or one on each side of the vehicle, the vehicle cargo carrying system 10 is extremely easy to load and unload, and to secure to the roof or the vehicle.

As is evident from the above description, a wide variety of vehicle car top carrying devices may been envisioned from the device described herein and additional advantages and modifications will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. A vehicle cargo carrying device, comprising:

a one piece cargo bag, said one piece cargo bag having an aperture with a plurality of pieces of hook and loop fastening material operably positioned in proximity thereto for secure closure of said aperture;

strapping system means for securing said one piece cargo bag to a roof of a vehicle; and handle means for carrying said one piece cargo bag and for guiding said strapping system means.

2. The vehicle cargo carrying device of claim 1, wherein said aperture has a plurality of pieces of hook and loop fastening material sewn into an outer surface of said bag in proximity to said aperture, and a pair of pieces of hook and loop fastening material sewn along an inner edge of the interior of said aperture.

3. The vehicle cargo carrying device of claim 1, wherein said strapping system means for securing said one piece cargo bag to a roof of a vehicle comprises a webbing of straps with a ladder lock operably positioned at each end thereof.

4. The vehicle cargo carrying device of claim 1, wherein said handle means for carrying said one piece cargo bag and for guiding said strapping system means comprises one or more pieces of durable resilient material secured to an outer surface of said one piece cargo bag.

5. The vehicle cargo carrying device of claim 1, wherein said one piece cargo bag is rectangularly configured.

6. The vehicle cargo carrying device of claim 1, further including a liner system comprising a liner which fits inside of the one piece cargo bag.

7. The vehicle cargo carrying device of claim 1, further including a side release buckle for further securing the closure of said aperture of said one piece cargo bag.

8. A cargo transport bag for transporting and protecting articles the roof of a vehicle, comprising:

a cargo bag, said cargo bag having an aperture with a plurality of pieces of hook and loop fastening material operably positioned in proximity thereto;

strapping system means for securing said cargo bag to a roof of a vehicle; and handle means for carrying said one piece cargo bag.

9. The cargo transport bag of claim 8, wherein said aperture has a plurality of pieces of hook and loop fastening material sewn into an outer surface of said bag in proximity to said aperture, and a pair of pieces of hook and loop fastening material sewn along an inner edge of the interior of said aperture.

10. The cargo transport bag of claim 8, wherein said strapping system means for securing said cargo bag to a roof of a vehicle comprises a webbing of straps with a ladder lock operably positioned at each end thereof.

11. The cargo transport bag of claim 8, wherein said handle means for carrying said cargo bag and for guiding said strapping system means comprises one or more pieces of durable resilient material secured to an outer surface of said one piece cargo bag.

12. The cargo transport bag of claim 8, wherein said cargo bag is rectangularly configured.

13. The cargo transport bag of claim 8, further including a liner system comprising a liner which fits inside of the cargo bag.

14. The cargo transport bag of claim 8, further including a side release buckle for further securing the closure of said aperture of said cargo bag.

* * * * *